United States Patent [19]

Coha et al.

[11] 4,213,415
[45] Jul. 22, 1980

[54] ANTIRATTLE STRUCTURE FOR A TRANSMISSION RATIO INDICATOR ASSEMBLY

[75] Inventors: Thomas F. Coha, Flint; Marvin L. Owen, Grand Blanc, both of Mich.

[73] Assignee: General Motors Corporation, Detroit, Mich.

[21] Appl. No.: 34,598

[22] Filed: Apr. 30, 1979

[51] Int. Cl.² .................. G01D 11/10; G09F 9/40
[52] U.S. Cl. .................... 116/28.1; 73/430; 116/DIG. 20; 188/113
[58] Field of Search .......... 116/28.1, DIG. 20, 307, 116/319, 324, 321; 74/10.6, 10.9; 180/82; 188/1 B

[56] References Cited

U.S. PATENT DOCUMENTS

| | | | |
|---|---|---|---|
| 1,850,807 | 3/1932 | Panish | 188/1 B |
| 2,347,129 | 4/1944 | Salit | 116/321 |
| 2,813,504 | 11/1957 | Johnson | 116/324 |
| 3,485,204 | 12/1969 | Christman | 116/324 |

Primary Examiner—Daniel M. Yasich
Attorney, Agent, or Firm—Donald F. Scherer

[57] ABSTRACT

A transmission ratio indicator assembly has a linear input member and an output member that moves on a constant radius. The input member includes a slide member guided on a flat surface, which slide member has an arm extending normal to the flat surface and into a slot formed in a follower portion of the output member. The follower portion has integral spring arms and is guided in a constant radius recess. The spring arms prevent the follower portion from vibrating in the recess. An indicator is secured to the follower and aligns with the transmission ratio selections imprinted on an indicia surface disposed on the outer wall of the constant radius recess in response to movement of the input member.

1 Claim, 5 Drawing Figures

U.S. Patent  Jul. 22, 1980  4,213,415
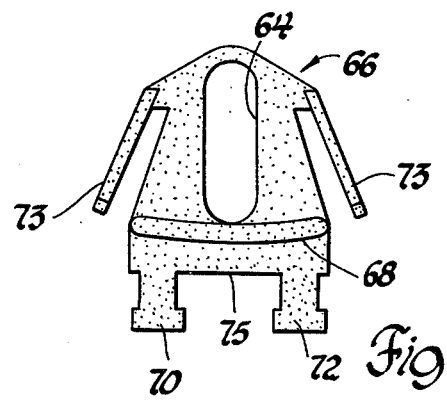
Fig.1
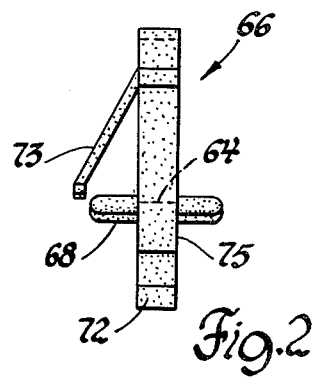
Fig.2
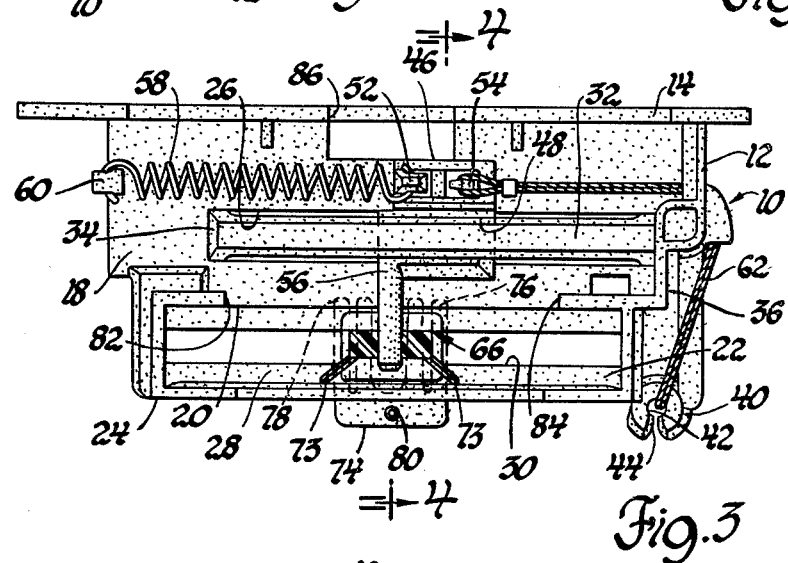
Fig.3
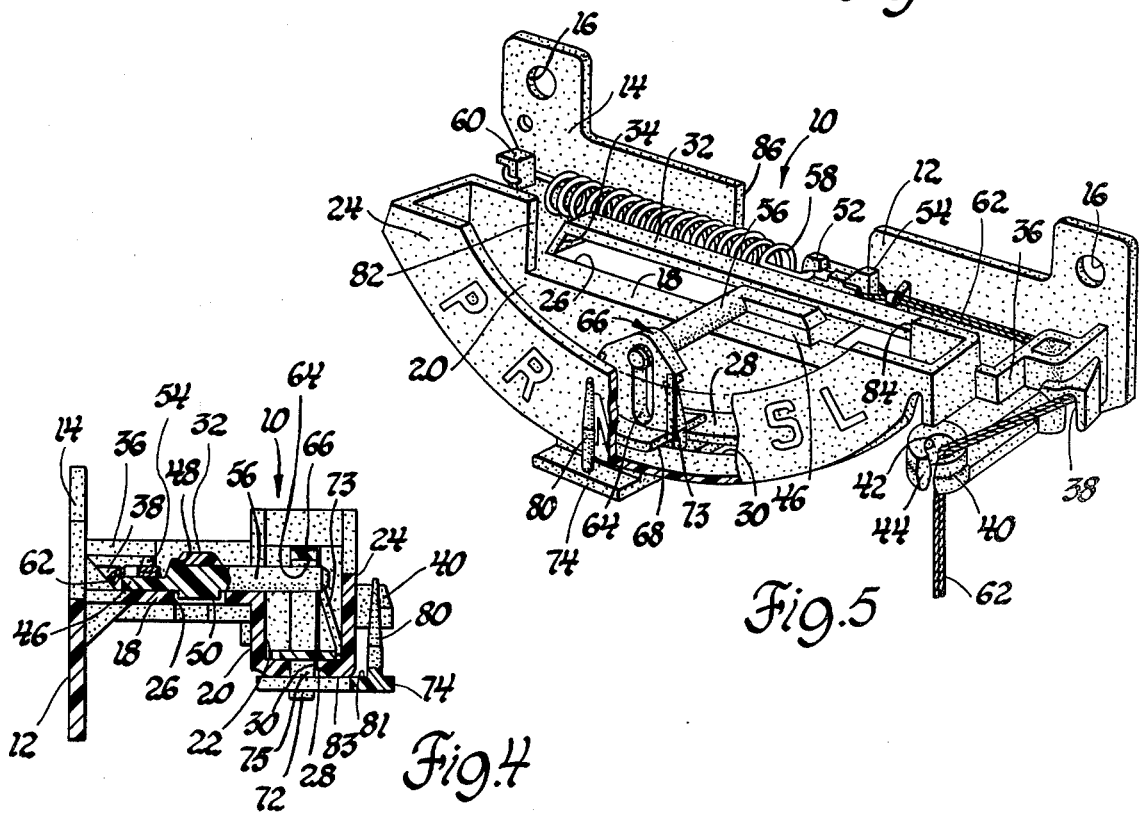
Fig.4
Fig.5

ANTIRATTLE STRUCTURE FOR A TRANSMISSION RATIO INDICATOR ASSEMBLY

This invention relates to indicator mechanisms and more particularly to automatic transmission ratio indicator assemblies.

It is an object of this invention to provide an improved transmission ratio indicator assembly wherein a linear operator input motion is translated to a constant radius output motion through a follower having integral spring arms which continuously bias the follower in a slot and prevent the follower from vibrating.

It is another object of this invention to provide an improved transmission ratio indicator assembly wherein a slide member is guided on a flat base for linear movement and has an arm portion drivingly connected in an elongated slot formed in a follower member which is guided for constant radius motion in a recess and is spring loaded within the recess to prevent rattling of the follower within the recess.

These and other ojbects and advantages of the present invention will be more apparent from the following description and drawings in which:

FIG. 1 is a front elevational view of a follower for a transmission ratio indicator assembly;

FIG. 2 is a side view of FIG. 1;

FIG. 3 is a top view of the transmission ratio indicator assembly;

FIG. 4 is a sectional view taken along line 4—4 of FIG. 3; and

FIG. 5 is a perspective view of the indicator assembly.

Referring now to the drawings, wherein like characters represent the same or corresponding parts throughout the several views, there is seen an indicator assembly generally designated 10, which is comprised of a unitary base structure 12 having a substantially vertical mounting surface 14 through which a plurality of holes 16 are formed to permit attachment of the base 12 in the instrument panel of an automotive vehicle. Extending substantially horizontally from the mounting surface 14 is a flat portion 18 which is also connected to a vertical wall 20 of a constant radius recess 22 formed between the wall 20 and another vertical wall 24. The flat surface 18 has formed therein a guide opening 26 and the recess 22 has a constant radius bottom surface 28 in which is formed a guide slot 30.

The guide opening 26 has vertically displaced therefrom a guide portion 32 which has one end wall 34 integrally formed between the guide 32 and flat surface 18. The other end of guide 32 is formed integrally with an irregularly shaped vertical wall 36 in which is formed a cable guide opening 38. A second cable guide opening 40, which is generally cylindrical in shape, is formed integrally with the base 12 and includes a substantially vertical through aperture 42 which is communicated with the outer surface of cable guide 40 through a vertical slot 44.

A slide member 46 has a guide recess 48 formed on the upper surface thereof and aligned with the guide 32 and a guiding protuberance 50 formed on the lower surface thereof which is aligned in the guide opening 26. There is also formed on the slide member 46 a pair of upstanding attachment posts 52 and 54 and a substantially horizontally extending arm 56. The guide post 52 has connected thereto one end of a tension type coil spring 58 the other end of which is connected to an attaching post 60 formed integrally with the base 12. The guide post 54 has attached thereto a cable 62 which is routed through cable guide opening 38 and aperture 42. The cable 62 is preferably then connected to a conventional transmission ratio selector assembly in the vehicle steering column.

The arm 56 rests on the flat surface 18 and extends into an elongated slot 64 formed in a follower member 66. The follower member 66 has a curved support surface 68 which rests on the curved surface 28 of recess 22. The follower 66 also has a pair of attaching posts 70 and 72 which depend from a wall 75 formed below surface 68 and extend through the guide slot 30. A pair of spring arms 73 extend from the follower member 66 and abut the inner surface of the wall 24 of recess 22. The spring arms 73 maintain the wall 75 in contact with the left side edge, as viewed in FIG. 4, of guide slot 30. This prevents the follower member 66 from vibrating relative to the base structure 12 thus eliminating a noise source that could be irritable to the operator.

The follower 66 is shown positioned in recess 22 such that the spring arms 73 contact the inner surface of wall 24. As seen in FIGS. 1 and 2, the follower, 66, except for the spring arms 73, is symmetrical. As can be seen in FIGS. 3 and 4, the groove 30 is essentially centered within the recess 22. Therefore, the follower 66 can be placed in the recess 22 such that the spring arms 73 will contact the inner surface of wall 20 which is on the opposite side of recess 22 from the inner surface of wall 24. In this reverse position, the antirattle feature of the follower 66 will also be operative.

An indicator member 74 has two bifurcated arms 76 and 78 which are attached to the posts 72 and 70, respectively. A pointer 80 is formed integrally with the indicator 74 and extends substantially parallel to the outer surface of wall 24 of recess 22. The outer surface of wall 34 has imprinted or otherwise disposed thereon, a plurality of transmission indicia such as "P" for Park, "R" for Reverse, "N" for Neutral, "D", not shown, for Drive, "S" and "L" for Intermediate and Low, respectively. The spring arms 73, while maintaining the posts 70 and 72 in contact with the edge of the slot 30, also maintain the upper surface 81 of indicator member 74 in contact with a guide rib 83 formed on the outer bottom surface of recess 22.

The spring 58 urges the slide member 46 to the left, as viewed in FIGS. 1 and 2, and due to the arm and slot drive arrangement, the follower member 66 and indicator 74 are urged in the same direction. The follower 66, however, must follow the constant radius curved path of recess 22. The linear to circular motion translation is permitted by the arm and slot drive arrangement. Movement of the slide member 46 to the left is limited by the arm 56 abutting a stop portion 82 formed by the intersection of flat surface 18 and wall 20 while rightward movement of the slide member 46 is limited by the arm 56 contacting a stop surface 84 also formed by the intersection of flat surface 18 and wall 20. These stop surfaces 82 and 84 limit the linear travel of slide member 46 and therefore also limit the arcuate travel of follower member 66. The steering column mounted shift assembly can also be utilized to limit the extent of travel, and also provide detented positions intermediate the stop surfaces in a well known manner.

When the vehicle operator places or desires to place the transmission in the "Park" mode, he moves the shift lever which relieves the load on cable 62 thus permitting the spring 58 to return the slide member 46 and therefore follower 66 to the far left position where the pointer 80 is aligned with "P" on the outer surface of wall 24. Through the use of the well known detent mechanisms, the operator can select the various drive ratios, and upon selection thereof, the pointer 80 will be aligned with the ratio selected due to controlled movement of the slide member 46 by the cable 62. The constant radius travelled by the indicator member 74 gives the appearance that the pointer 80 is continually directed toward the center of the radius. This provides some aesthetic value to the instrument panel and permits the indicator assembly to be placed on the periphery of a substantially circular speedometer cluster.

The unitary or one-piece base 12 reduces the number of parts necessary to be handled at assembly. The indicator assembly 10 is quite easily assembled. Assuming the spring 58 is not connected to the slide member 46, the slide member 46 can be inserted into the position shown through an opening 86 formed in the mounting surface 14 which is substantially centrally located therein and the guide 32 has sufficient resiliency to move vertically at the center thereof to permit the easy insertion of the slide member 46. The follower member 66 and indicator 74 are preassembled in the recess 22 such that at assembly, the arm 56 will engage in the slot 64. Then the spring 58 can be attached to posts 60 and 52 after which the cable 62 is routed through opening 38 and opening 42 and connected to post 54. The vertical slot 44 assists in permitting the cable 62 to be inserted in the opening 42 at assembly. Thus, as above described, it is seen that the indicator assembly permits easy assembly.

The embodiments of the invention in which an exclusive property or privilege is claimed are defined as follows:

1. An improvement in transmission ratio indicators having a slide member guided in a housing for linear movement by the operator and a follower member driven by the slide member and being constrained in a slot in the housing for selective movement within a constant radius recess, wherein the improvement comprises; a pair of outwardly extending spring arms formed integrally with said follower and slidably contacting the housing in the constant radius recess external to the slot to preload the follower to one side of the slot and to prevent the follower from vibrating in the slot.

* * * * *